(12) United States Patent
Mulligan

(10) Patent No.: US 8,231,184 B2
(45) Date of Patent: Jul. 31, 2012

(54) CRAWLER TRACK ROLLER WITH INTERNAL SPHERICAL SPACERS

(75) Inventor: Patrick John Mulligan, Dubuque, IA (US)

(73) Assignee: Deere & Company, Moline, IL (US)

( * ) Notice: Subject to any disclaimer, the term of this patent is extended or adjusted under 35 U.S.C. 154(b) by 248 days.

(21) Appl. No.: 12/624,793

(22) Filed: Nov. 24, 2009

(65) Prior Publication Data

US 2011/0121643 A1 May 26, 2011

(51) Int. Cl.
*B62D 55/14* (2006.01)
(52) U.S. Cl. .......................................... 305/136; 305/138
(58) Field of Classification Search ................... 305/130, 305/136–138
See application file for complete search history.

(56) References Cited

U.S. PATENT DOCUMENTS

| | | | |
|---|---|---|---|
| 2,823,079 A | 2/1958 | Williams | |
| 2,926,968 A | 3/1960 | Toth | |
| 2,952,495 A | 9/1960 | Herr, Jr. | |
| 3,586,398 A | 6/1971 | Dadds et al. | |
| 3,843,214 A * | 10/1974 | Piepho | 305/119 |
| 3,869,931 A * | 3/1975 | Boggs | 474/151 |
| 4,640,559 A | 2/1987 | Crotti | |
| 5,288,143 A * | 2/1994 | Dester et al. | 305/137 |
| 5,302,012 A * | 4/1994 | Dester et al. | 305/193 |
| 5,803,558 A | 9/1998 | Ketting et al. | |
| 6,851,768 B2 | 2/2005 | Takeno et al. | |
| 6,874,859 B1 * | 4/2005 | Duse | 305/136 |
| 7,374,257 B2 * | 5/2008 | Oertley | 305/136 |

FOREIGN PATENT DOCUMENTS

GB 1277222 6/1972

* cited by examiner

*Primary Examiner* — Jason Bellinger

(57) ABSTRACT

An endless track support roller is mounted for rotation about a shaft adapted for being fixed between parallel rails of a track support frame. The roller comprises mirror image halves, with a pair of thrust bushings being received on the shaft and respectively disposed in supporting relationship to the roller halves. Each thrust bushing includes an axially outwardly facing thrust face. Mounting brackets fixed to opposite ends of the shaft are adapted to be fixed to the pair of frame rails. Non-uniform edge loading of the bushings resulting from shaft deformations caused by flexure of the frame rails is minimized by providing axially inwardly facing ends of the brackets with spherically contoured surfaces, and by locating an annular spacer between each bracket and bushing thrust face, the annular spacer having outer and inner axially facing surfaces respectively shaped complimentary to the spherically contoured bracket surface and to the bushing thrust face.

5 Claims, 3 Drawing Sheets

CRAWLER TRACK ROLLER WITH INTERNAL SPHERICAL SPACERS

FIELD OF THE INVENTION

The present invention relates to crawler track roller assemblies, and, more particularly, relates to such assemblies that include rollers received on thrust bushings located on support shafts fixed to the track frame.

BACKGROUND OF THE INVENTION

Utility crawler track rollers experience significantly high rates of failure. One of the reasons for these failures is believed to be attributable to the internal thrust bushing experiencing non-uniform loading resulting in the bushing overheating with this heat being transferred to the adjacent metal face seal provided between an end of the roller and a mounting bracket for the support shaft end, which, over time results in the metal face seal melting and the eventual failing of the roller.

Although a more a more robust roller assembly could be used to overcome these face seal and roller failures, this would prove to be cost prohibitive in this highly cost competitive size of crawlers.

Accordingly, the problem to be solved is that of providing a track roller assembly for utility crawlers which is durable and cost competitive.

SUMMARY OF THE INVENTION

The foregoing object is achieved by a roller assembly which, in addition to a thrust bushing assembly mounted between the roller and the support shaft, includes a spacer assembly which includes an annular spacer located at each of opposite ends of the bushing assembly and having an axially outwardly facing side defined by a concave spherically contoured surface that mates against a convex spherically contoured annular surface formed on an axially inwardly facing end of a respective one of a pair of brackets adapted for mounting the shaft to the track frame, each spacer also having an axially inwardly facing side defined by an annular flat or planar contact surface engaged with a complementary axially outward facing annular planar or flat thrust face provided at an adjacent end of the thrust bushing assembly.

DESCRIPTION OF THE PREFERRED EMBODIMENT

Figure 1:
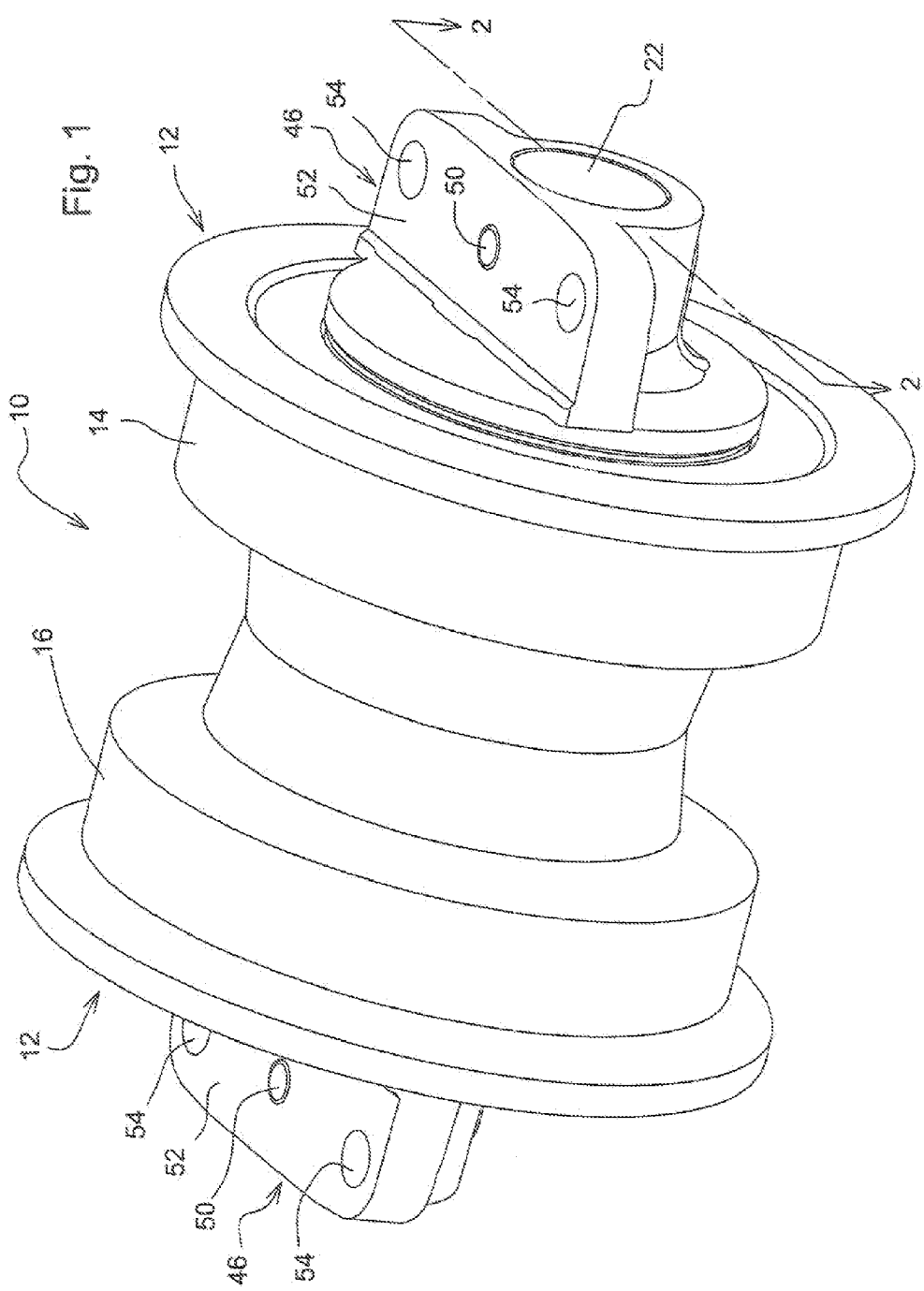
FIG. 1 is an oblique view of a roller embodying the present invention.
Figure 2:
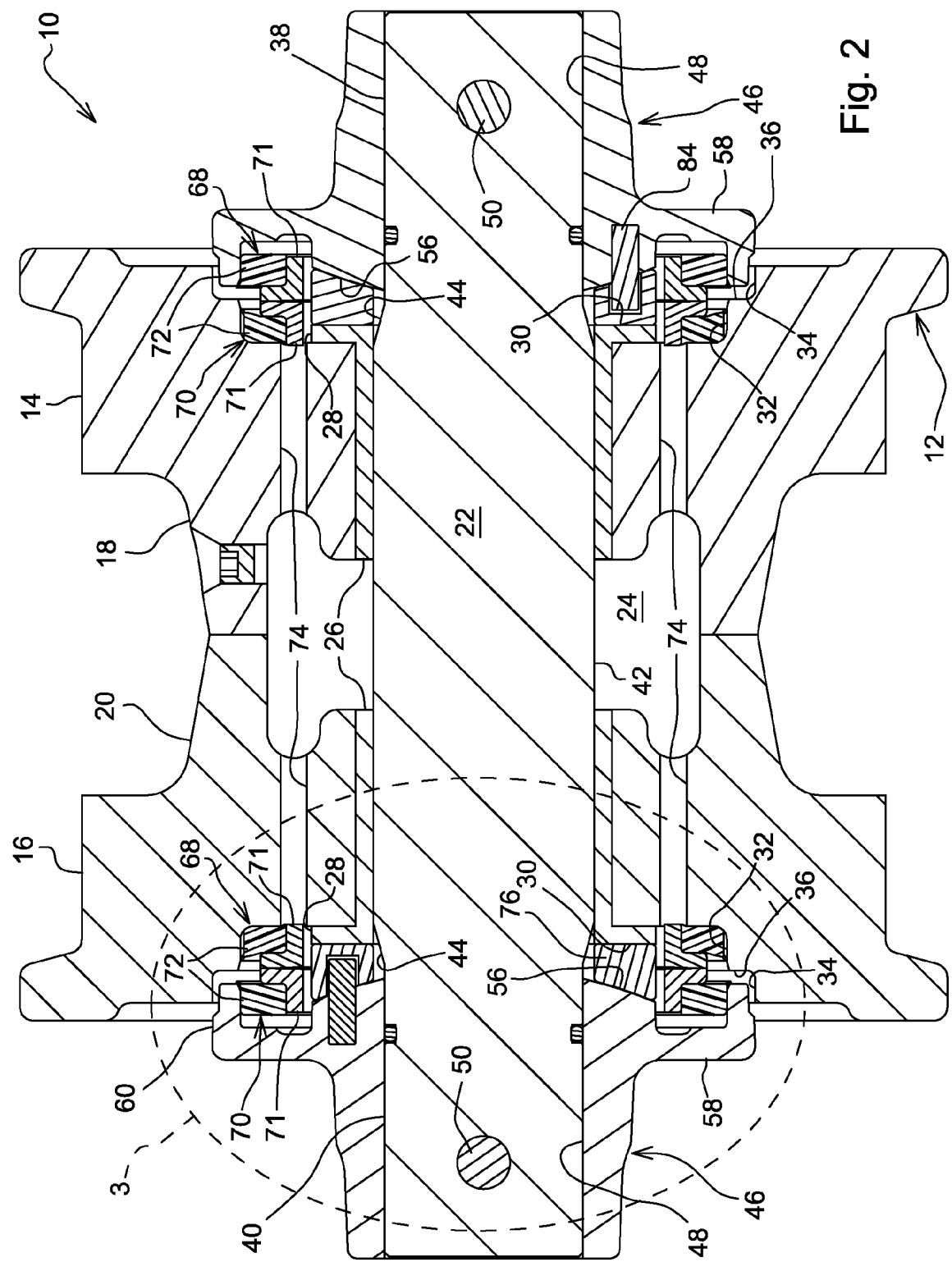
FIG. 2 is a longitudinal sectional view taken along the line 2-2 of FIG. 1.

Referring now to FIGS. 1 and 2, there is shown a roller 10 of a type used together with a plurality of other rollers for supporting the endless track of a track laying tractor from the parallel support rails of a track support frame (not shown). The roller 10 includes a roller body 12 comprising right and left, mirror image halves 14 and 16, respectively, having respective confronting, inner annular flanges 18 and 20 extending axially towards each other from regions approximately halfway between inner and outer diameters of the halves 14 and 16. The annular flanges 18 and 20 have axially facing, annular abutting end surfaces, with a seam weld being formed in an exterior region of each of the flanges thereby joining the roller body halves together. The flanges cooperate with a shaft or axle 22 extending axially through the roller body 12 to form a lubricant cavity 24 which is sealed from leaking across the interface of the body 12 with the shaft by a thrust bushing assembly comprising a pair of thrust bushings 26 respectively being press fit within, and extending over the entire lengths of respective bores extending axially through the center of the roller body halves 14 and 16, the bushings being loosely mounted on the shaft 22 so as to rotate with the roller body 12 about the shaft 22. Outer ends of the bushings 26 are each defined by a radially extending annular flange 28 having an axially inwardly facing surface engaged with one of a pair of flat or planar annular surfaces at the outer ends of the roller body 12, and having an axially outwardly facing annular flat or planar thrust face 30.

The opposite outer end surfaces of each of the roller body halves 14 and 16 are each defined by a recess which is stepped increasingly inwardly from an outer, to an inner, diameter of the body 12, with an innermost and next adjacent steps being respectively defined by cylindrical walls 32 and 34 joined together by a radially extending annular wall 36.

The shaft 22 has opposite end regions 38 and 40 that respectively project beyond the opposite ends of the roller body 12 and are of a reduced diameter relative to a central region 42 of the shaft, with the central and end regions being joined to each other by respective conical sections 44 tapering from locations below the annular flanges 28 of the thrust bushings 26. Mounting brackets 46 each include a central bore 48 and are respectively received on the shaft end regions 38 and 40 and are secured in place by respective pins 50. As can be seen in FIG. 1, the brackets 46 each include a horizontal upper surface 52 adapted for engagement with a flat surface of a respective one of a pair of parallel track support frame rails (not shown) with the brackets each extending crosswise to the shaft 22 so as to define oppositely projecting ears in each of which is located a vertical mounting hole 54 adapted for receiving a mounting bolt (not shown) for securing the pair of brackets 46 to the pair of track support frame rails. Inner ends of each of the mounting brackets 46 are located on the shaft 22 at the smaller end of the adjacent conical section 44, the inner end of the mounting bracket being defined by an annular axially inwardly facing, concave spherically contoured surface 56.

Figure 3:
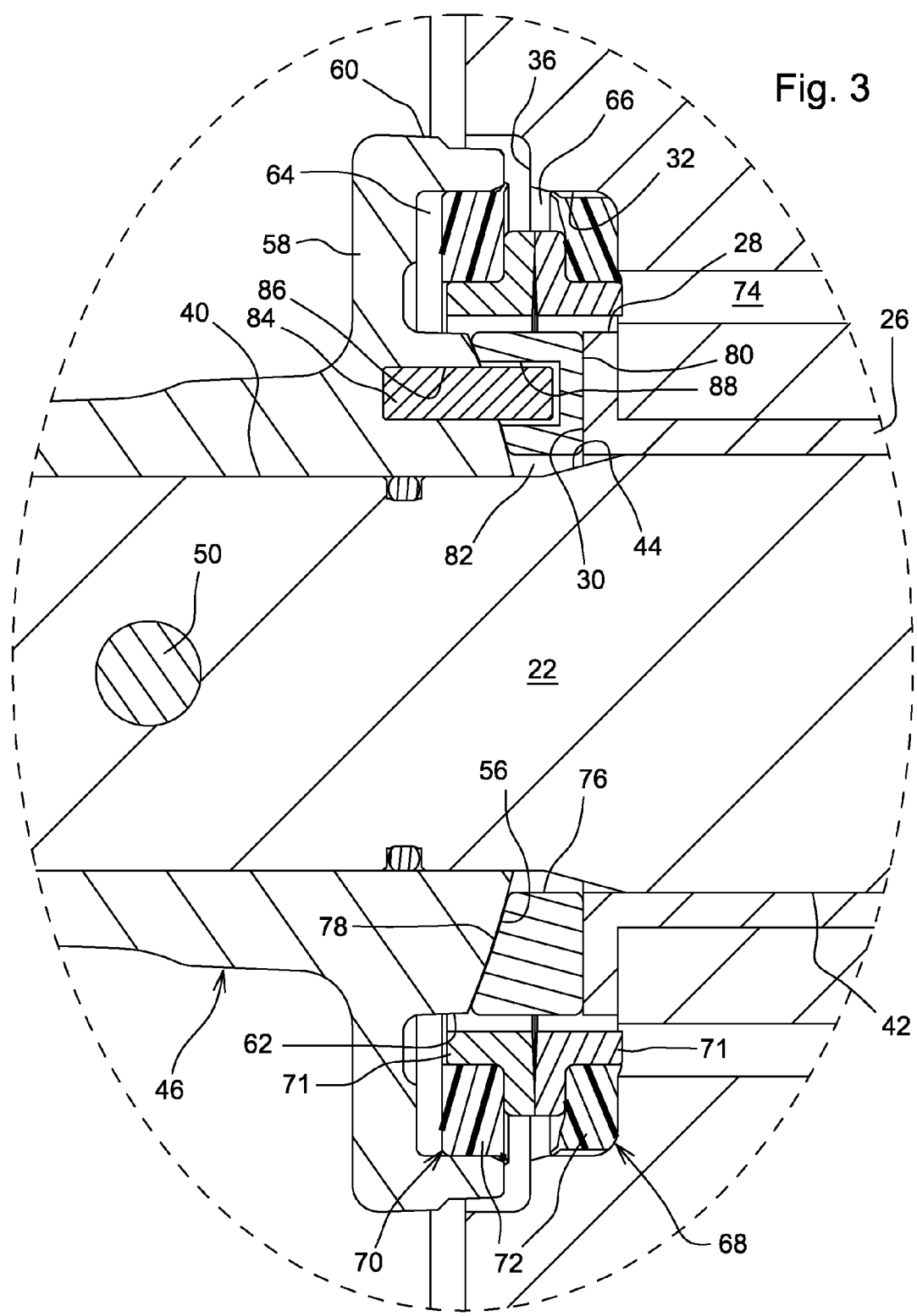
FIG. 3 is an enlarged view of a left end region of FIG. 2 encircled by the dashed line 3 and showing the annular spherically contoured interface defined between the left spacer and the left mounting bracket.

Referring now also to FIG. 3, it can be seen that the mounting brackets 46 each further include a radially extending annular wall 58 joined to an annular cylindrical rim 60 which projects axially inwardly from the wall 58 so as to be closely adjacent the roller body recess step 34 and so as to be spaced radially outwardly from an outer cylindrical surface 62 of an inner end region of the bracket 46 thereby forming an annular face seal cavity portion 64. A second annular face seal cavity portion 66 is defined between the roller body recess step 32 and the top of the bushing flange 28. Respectively located within the seal cavity portions 64 and 66 at each of the opposite sides of the roller body 12 are right and left face seal assemblies 68 and 70, each including a metal sealing ring 71 which is generally right angular in cross section, with flat surfaces of the metal rings being disposed in abutting relationship to each other. The metal face seal rings 71 are maintained in sealing, sliding contact with each other by elastomeric annular seals 72, which are rectangular in cross section, one of the seals 72 being compressed between the roller body 12 and the adjacent face seal ring 71 and the other of the seals 72 being compressed between the bracket 46 and the adjacent face seal ring 71. Connected between the lubricant cavity 24 and locations radially inwardly of the annular seals 72 are a plurality of axially extending lubricant passages 74, shown only in FIGS. 2 and 3.

The spherically contoured end surface 56 at the inner end of each of the brackets 46 is axially spaced from the thrust face 30 of the adjacent thrust bushing 26 so as to leave an annular space in which is located an annular spacer 76 having an outer, axially facing annular, concave spherically contoured surface 78 and an inner, axially facing annular, planar contact surface 80. The spherically contoured surface 78 is shaped complementary to, and is in slidable engagement with, the annular, spherically contoured surface 56 at the inner end of the adjacent mounting bracket 46, while the planar surface 80 is in slidable engagement with the planar thrust face 30 of the adjacent bushing 26. The inside diameter of the spacer 76 is greater than the largest diameter of the conical shaft section 44 surrounded by the spacer so that an annular clearance gap 82 is provided when the shaft 22 is centered within the spacer 76, the gap 82 permitting the spacer 76 to float during loading of the shaft 22 so that substantially even axial loads are imposed on the thrust face 30 of the adjacent bushing 26. Aiding in maintaining an even wear at the interface of each of the mating sets of spherically contoured surfaces 56 and 78 is a dowel pin 84 tightly received in a blind bore 86 extending axially into the bracket 46 from the spherically contoured surface 56 and received loosely in an aligned blind bore 88 extending axially into the spacer 76 from the spherically contoured surface 78. While the spherically contoured end surface 56 of each of the brackets 46 is shown as being convex and the spherically contoured side surfaces 78 of each of the spacers 76 is shown as being concave, it will be understood that each bracket end surface 46 could be concave and each spacer side surface 78 could be convex without affecting the desired operation of the assembled roller 10.

In operation, the roller 10 will be used with a plurality of like rollers mounted on a track support frame with the brackets 46 at the opposite ends of the shaft 22 being bolted to respective longitudinally extending track support frame rails. When the track frames are loaded such that they flex, twisting loads are transferred to the roller shaft 22 by way of the mounting brackets 46 and pins 50. Axial components of these loads are imposed on the spacers 76 by way of the engaged spherically contoured surfaces 56 and 78, with this loading thus being uniformly distributed and transferred to the annular thrust faces 30 of the thrust bushings 26 by way of the annular planar spacer contact surfaces 80. Non-uniform "edge" loading of the annular thrust faces 30 of the thrust bushings 26 is thus minimized or eliminated thereby avoiding heat generation due to binding between the roller body 12 and the bushings 26, thereby avoiding overheating and melting of the metal face seal rings 71 of the face seal assemblies 68 and 70, with the consequent loss of lubricant and the eventual complete failure of the roller 10.

Having described the preferred embodiment, it will become apparent that various modifications can be made without departing from the scope of the invention as defined in the accompanying claims.

The invention claimed is:

1. A mounting for a track support roller of a track laying tractor, comprising: a shaft extending axially through said roller and having opposite ends projecting axially beyond opposite axially facing ends of said roller; a thrust bushing assembly received on said shaft in supporting relationship to said roller for permitting said roller to rotate about said shaft, with said thrust bushing assembly including opposite ends defined by annular, axially outwardly facing thrust faces; a pair of annular spacers being received on said shaft respectively adjacent said opposite ends of said thrust bushing assembly; each of said spacers having an inner axially facing, annular contact surface engaged with an adjacent one of the thrust faces of said thrust bushing assembly and having an outer axially facing annular surface; first and second mounting brackets being respectively fixed to said opposite ends of said shaft and having inner axially facing annular surfaces shaped complementary to and abutting said outwardly facing annular surfaces of said pair of annular spacers, with the complementary abutting surfaces of adjacent ones of the pair of spacers and first and second brackets each being spherically contoured thereby defining a spherically contoured interface.

2. The mounting, as defined in claim 1, wherein the axially inwardly facing annular surface of each of said first and second brackets is defined by a convex annular spherically contoured surface.

3. The mounting, as defined in claim 1, and further including a pair of fasteners respectively securing said pair of annular spacers in angular relationship to said first and second mounting brackets.

4. The mounting, as defined in claim 3, wherein said pair of fasteners are respectively defined by a pair of pins respectively received in and extending axially from said first and second mounting brackets and into said pair of annular spacers.

5. In a mounting for a track support roller of a track laying tractor including a shaft extending axially through the support roller and having opposite end sections respectively extending axially beyond opposite ends of said roller, a thrust bushing assembly being received on said shaft and respectively including opposite ends defined by axially outwardly facing, annular thrust faces respectively located at said opposite ends of the roller, and first and second mounting brackets respectively fixed to said opposite end sections of said shaft, the improvement comprising: said first and second mounting brackets respectively including first and second axially inwardly facing annular spherically contoured surfaces respectively disposed in axially spaced relationship to said axially outwardly facing, annular thrust faces so as to respectively define first and second axial gaps; and a pair of annular spacers respectively filling said gaps and having axially outwardly facing annular surfaces shaped complementary to, and engaged with, said first and second axially inwardly facing annular spherically contoured surfaces of said first and second brackets, and having first and second axially inwardly facing annular contact surfaces engaged with said axially outwardly facing, annular thrust faces of said thrust bushing assembly.

* * * * *